United States Patent
Kandel et al.

(10) Patent No.: US 10,685,165 B2
(45) Date of Patent: Jun. 16, 2020

(54) METROLOGY USING OVERLAY AND YIELD CRITICAL PATTERNS

(71) Applicant: KLA-Tencor Corporation, Milpitas, CA (US)

(72) Inventors: Daniel Kandel, Aseret (IL); Mark D. Smith, Austin, TX (US); Mark Wagner, Rehovot (IL); Eran Amit, Haifa (IL); Myungjun Lee, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 79 days.

(21) Appl. No.: 15/082,152

(22) Filed: Mar. 28, 2016

(65) Prior Publication Data
US 2016/0253450 A1    Sep. 1, 2016

Related U.S. Application Data

(63) Continuation of application No. PCT/US2015/039437, filed on Jul. 7, 2015.
(Continued)

(51) Int. Cl.
*G01R 31/14* (2006.01)
*G06F 30/398* (2020.01)
(Continued)

(52) U.S. Cl.
CPC .......... *G06F 30/398* (2020.01); *G01N 21/93* (2013.01); *G01N 21/956* (2013.01); *H01L 22/30* (2013.01);
(Continued)

(58) Field of Classification Search
CPC . G06F 17/5081; G06F 2217/12; G01N 21/93; G01N 21/956; G01N 2201/13;
(Continued)

(56) References Cited

U.S. PATENT DOCUMENTS

| 7,448,012 B1* | 11/2008 | Qian | ................... G06F 17/5068 |
|---|---|---|---|
| | | | 716/122 |
| 2005/0166174 A1* | 7/2005 | Ye | .......................... G03F 7/705 |
| | | | 716/51 |

(Continued)

FOREIGN PATENT DOCUMENTS

| CN | 102209935 | 10/2011 |
|---|---|---|
| JP | 2012501553 | 1/2012 |

(Continued)

*Primary Examiner* — Robert G Bachner
(74) *Attorney, Agent, or Firm* — Simpson & Simpson, PLLC

(57) ABSTRACT

Metrology methods are provided, which comprise identifying overlay critical patterns in a device design, the overlay critical patterns having an overlay sensitivity to process variation above a specified threshold that depends on design specifications; and using metrology targets that correspond to the identified overlay critical patterns. Alternatively or complementarily, metrology methods comprise identifying yield critical patterns according to a corresponding process window narrowing due to specified process variation, wherein the narrowing is defined by a dependency of edge placement errors (EPEs) of the patterns on process parameters. Corresponding targets and measurements are provided.

6 Claims, 13 Drawing Sheets

Related U.S. Application Data

(60) Provisional application No. 62/023,882, filed on Jul. 13, 2014, provisional application No. 62/138,974, filed on Mar. 27, 2015, provisional application No. 62/158,611, filed on May 8, 2015.

(51) Int. Cl.
  *H01L 21/66* (2006.01)
  *G01N 21/93* (2006.01)
  *G01N 21/956* (2006.01)
  *G06F 119/18* (2020.01)

(52) U.S. Cl.
  CPC ...... *G01N 2201/13* (2013.01); *G06F 2119/18* (2020.01); *H01L 22/12* (2013.01); *Y02P 80/30* (2015.11)

(58) Field of Classification Search
  CPC .......... H01L 22/30; H01L 22/12; Y02P 80/30; G03F 7/705; G03F 7/70625; G03F 7/70633; G03F 1/36; G03F 7/70616; G03F 7/70641; G03F 7/70441; G03F 7/70508; G03F 7/70683; G03F 1/70; G03F 7/7065; G03F 1/80; G03F 7/70125; G03F 9/7003; G03F 1/84; G03F 7/70433
  See application file for complete search history.

(56) References Cited

U.S. PATENT DOCUMENTS

| | | | |
|---|---|---|---|
| 2005/0283747 A1* | 12/2005 | Adam | G03F 1/36 716/52 |
| 2007/0230776 A1 | 10/2007 | Edgar et al. | |
| 2009/0079005 A1* | 3/2009 | Haffner | H01L 21/28123 257/368 |
| 2012/0051523 A1 | 3/2012 | Feke | |
| 2013/0275926 A1 | 10/2013 | Wang et al. | |
| 2013/0311960 A1 | 11/2013 | Tsai et al. | |
| 2013/0321810 A1 | 12/2013 | Wang et al. | |
| 2014/0109026 A1 | 4/2014 | Wang et al. | |
| 2014/0136137 A1 | 5/2014 | Tarshish-Shapir et al. | |

FOREIGN PATENT DOCUMENTS

| | | |
|---|---|---|
| TW | 201409648 A | 3/2014 |
| TW | 201413893 | 4/2014 |
| TW | 201415008 | 4/2014 |
| TW | 201423837 A | 6/2014 |
| WO | WO2014/062972 | 4/2014 |
| WO | WO2014/081897 | 5/2014 |

\* cited by examiner

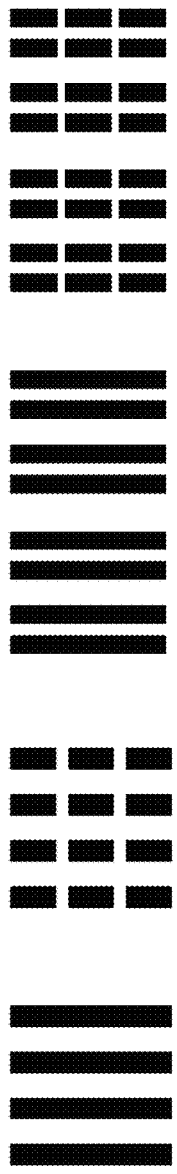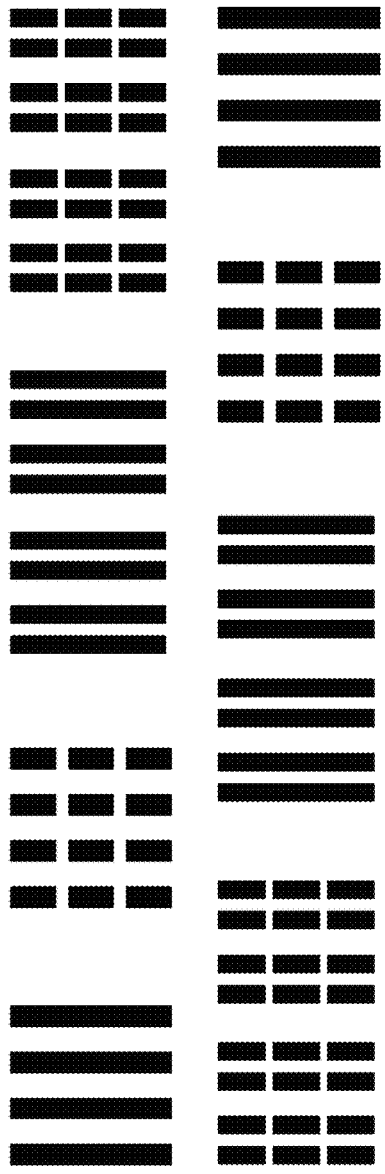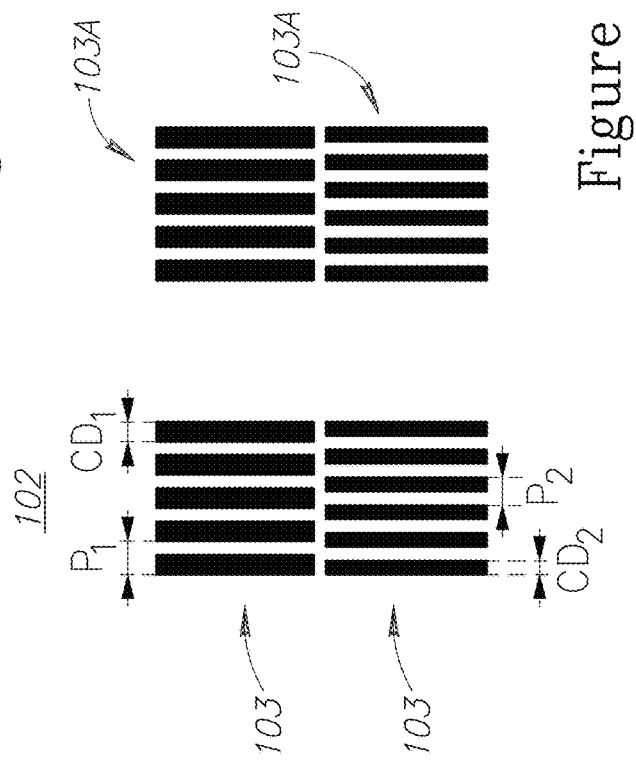
Figure 5A
Figure 5B

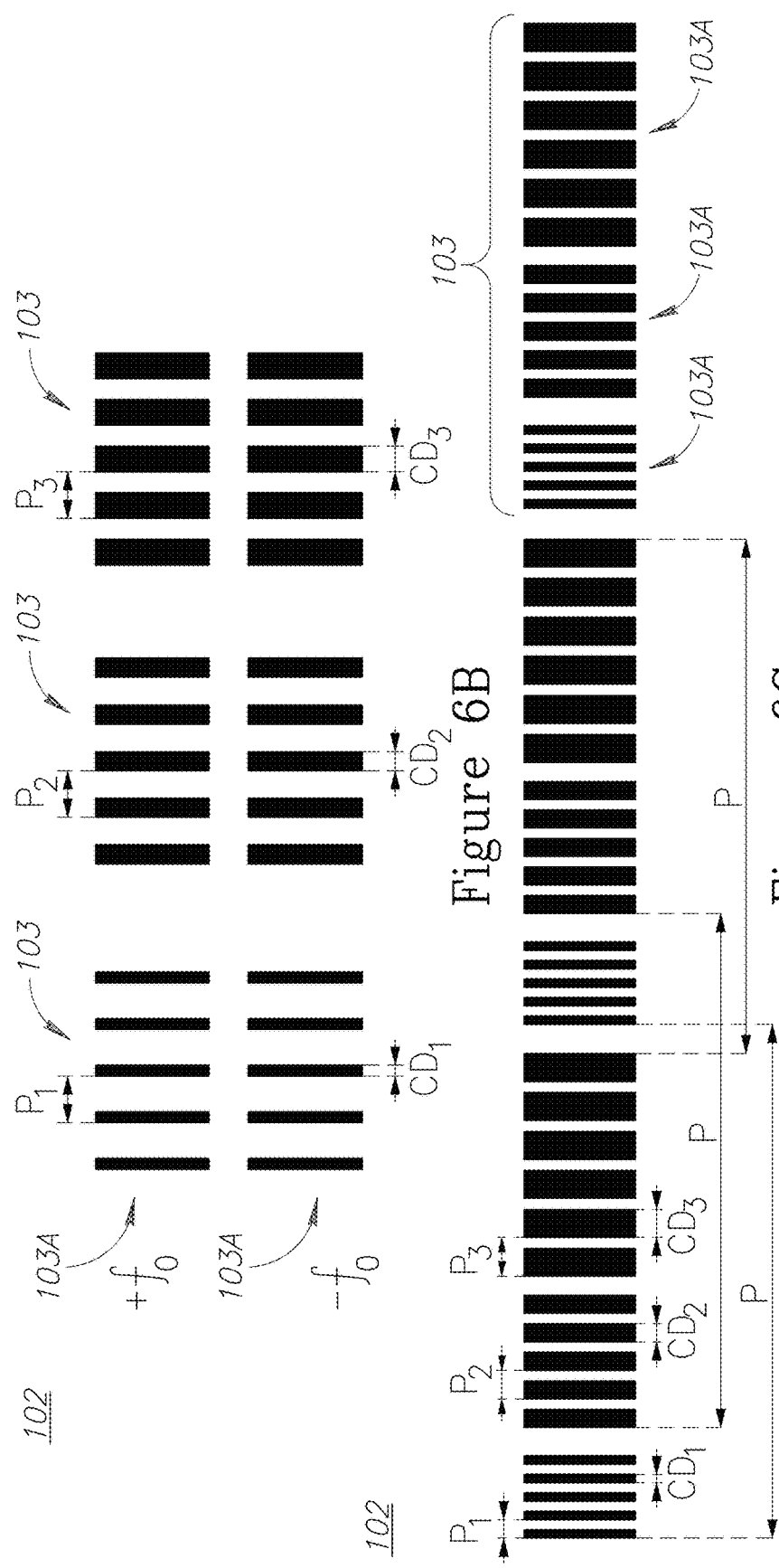

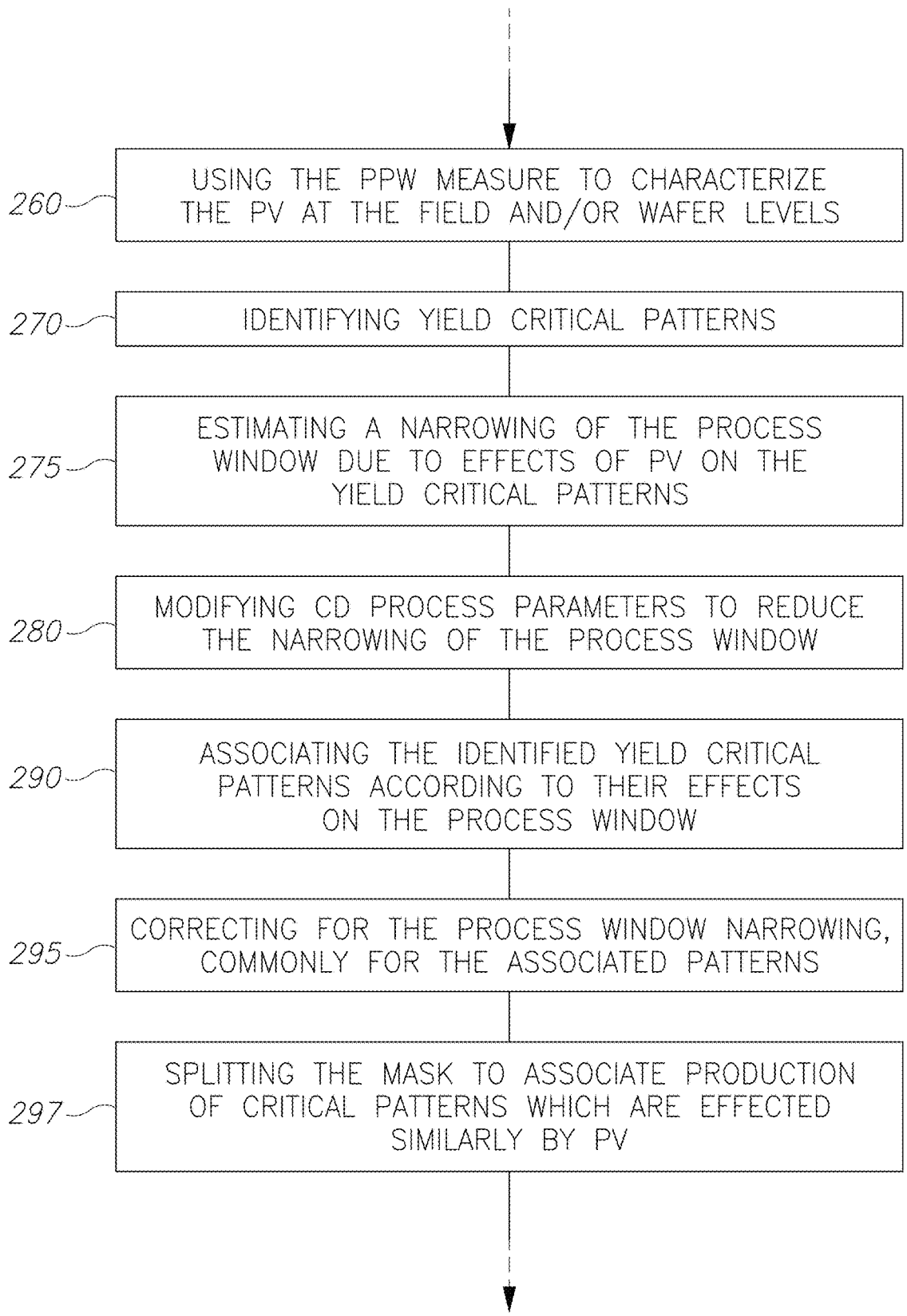
Figure 11 (cont. 1)

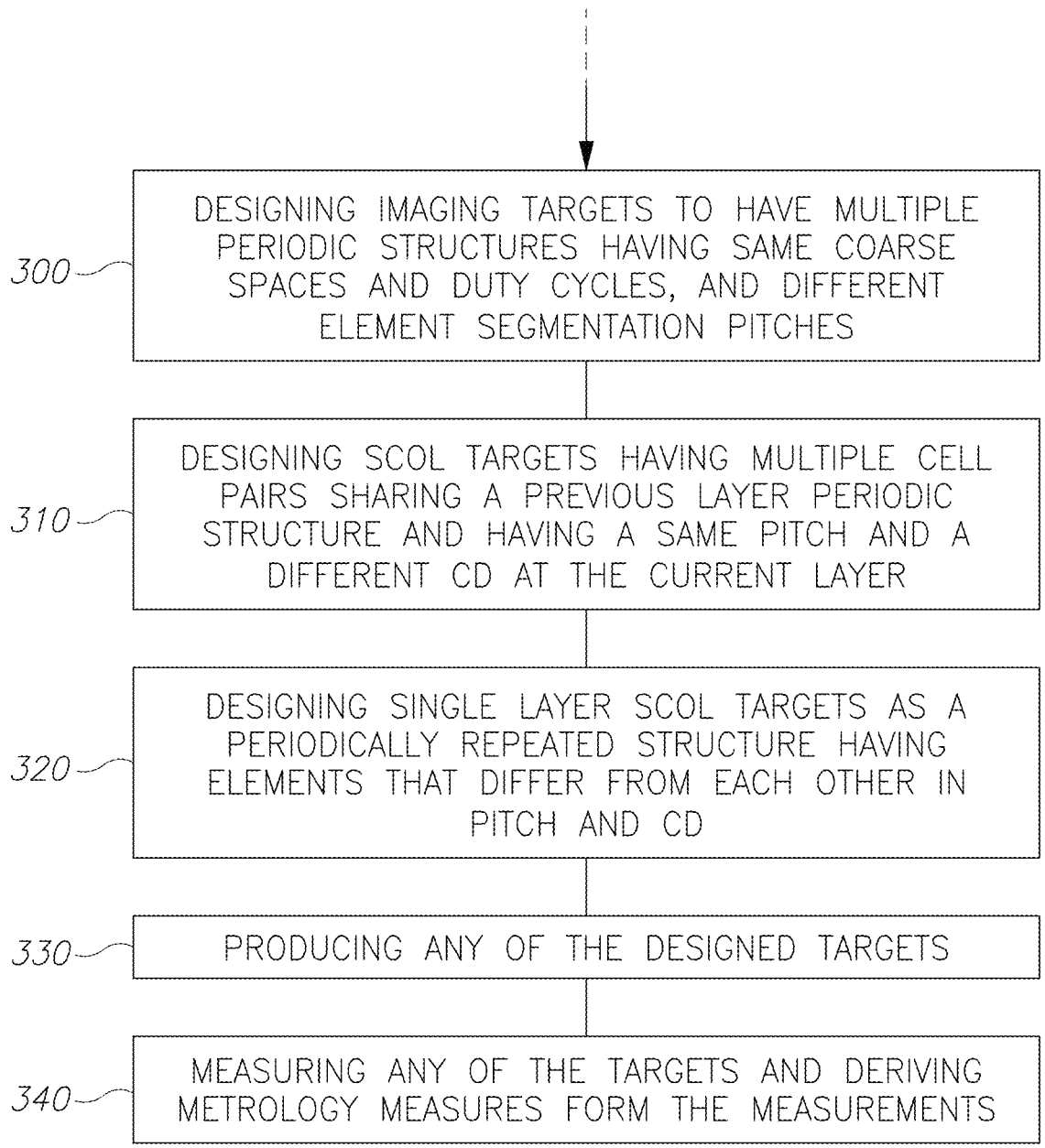
Figure 11 (cont. 2)

METROLOGY USING OVERLAY AND YIELD CRITICAL PATTERNS

CROSS REFERENCE TO RELATED APPLICATIONS

This application is filed under 35 U.S.C. § 120 and § 365(c) as a continuation of International Patent Application Serial No. PCT/US15/39437, filed on Jul. 7, 2015, which application claims the benefit under 35 U.S.C. 119(e) of U.S. Provisional Patent Application No. 62/023,882 filed on Jul. 13, 2014, U.S. Provisional Patent Application No. 62/138,974 filed on Mar. 27, 2015 and U.S. Provisional Patent Application No. 62/158,611 filed on May 8, 2015, which applications are incorporated herein by reference in their entirety.

BACKGROUND OF THE INVENTION

1. Technical Field

The present invention relates to the field of metrology, and more particularly, to metrology of device patterns.

2. Discussion of Related Art

As device production processes advance, metrology copes with smaller device details which limit significantly the available overlay budget. Hence new types of targets, new measurement algorithms and new process correction algorithms are required.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising identifying overlay critical patterns in a device design, the overlay critical patterns having an overlay sensitivity to process variation above a specified threshold that depends on design specifications; and using metrology targets that correspond to the identified overlay critical patterns.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 5A, 5B and 6A-6C are high level schematic illustrations of PPW targets, according to some embodiments of the invention.

DETAILED DESCRIPTION OF THE INVENTION

Figure 1:
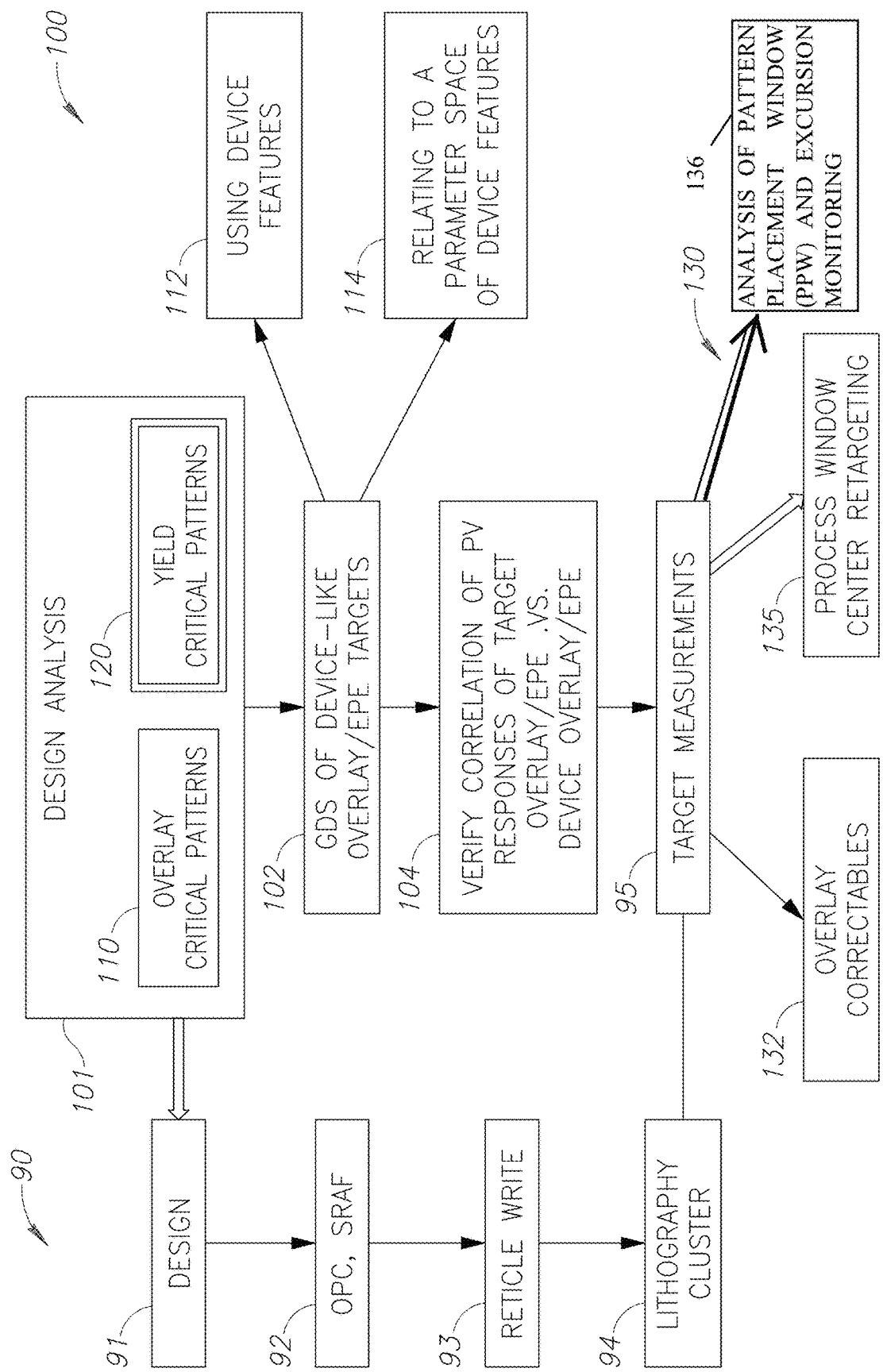
FIG. 1 is a high level schematic block diagram of metrology stages in the context of a fabrication flow, according to some embodiments of the invention.

Prior to the detailed description being set forth, it may be helpful to set forth definitions of certain terms that will be used hereinafter.

The term "overlay" (OVL) as used in this application refers to a measure that quantifies a horizontal distance between different layers or structural elements in a produced device. OVL generally quantifies the inaccuracy in the production of layers or elements which are designed to be overlapping.

The term "edge placement error" (EPE) as used in this application refers to a combination of overlay and dimensional measures of design and production elements, which quantifies the difference between produced element edges and designed element edges. For example, EPE may be defined as the minimal distance between two produced features. EPE may also refer to the distance between two features that defines some electrical property (capacitance, resistivity etc.) which is critical to the device functioning.

The term "process variation" (PV) as used in this application refers to the range of possible differences between a device design and the produced device, which is due to a large number of production factors, like parameters of various steps in the lithography process. PV further refers to the entirety of inaccuracy sources in the production process.

The term "process window" as used in this application refers to the range of production deviations which is acceptable under given specifications. The term "threshold" as used in this application refers to values that are derived from design specifications and relate to specific patterns, overlays and/or EPEs. The term "critical patterns" as used in this application refers to specific design patterns which are exceptionally sensitive to PV, i.e., design patterns having a particularly low threshold.

The term "pattern placement window" (PPW) as used in this application refers to the range of variability of the placement of different patterns under certain PV.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of metrology stages 100 in the context of a fabrication flow 90, according to some embodiments of the invention. Fabrication flow 90 is represented schematically as a sequence of design stages 91, (optionally) application of optical proximity correction (OPC) and sub resolution assist features (SRAF) 92, reticle write steps 93 and a lithography cluster of steps 94 including the actual production steps, e.g., of deposition, etch, chemical-mechanical planarization (CMP) and any other mechanical, chemical and optical (exposure) steps. In current technology, metrology procedures are integrated in fabrication flow 90 and include design stages of incorporating target design GDS (Graphic Data System file, or a design format in any other format) into wafer design 91, OPC 92, reticle write 93 and lithography cluster 94; and consequently target measurement stages 95 and derivation of measures for correcting the production process, e.g., in form of overlay correctables 132. Efforts are made to design targets to be both measurable and compliant with design rules to ensure their printability.

Embodiments of metrology flows 100 improve several aspects of current metrology technology (illustrated by doubled lines in arrows and frame). In certain embodiments, design analysis 101 comprises identifying overlay critical patterns 110 and/or yield critical patterns 120 in design 91 of the devices. It is noted that critical patterns 110 comprise design patterns which are exceptionally sensitive to PV, i.e., design patterns having a particularly low threshold, as derived from design specifications and referring to required overlays and/or EPEs values. It is further noted that the analysis of a device design and the derivation of critical patterns 110 may be complex and involve various considerations which may be derived from certain embodiments of the present invention.

Overlay critical patterns 110 comprise device features which are more sensitive to overlay errors than other device features, for example patterns in which lines are close or gaps are narrow. Such patterns may be designed in one or more layers and/or be produced by one or more lithography steps, so that an overlay between different layers and/or elements produced in different lithography steps may occur, e.g., due to process variation. PV in this context may comprise any sort of inaccuracy in any of the lithography steps, including illumination imperfections, inaccuracies due to mechanical and/or chemical processes etc.

Yield critical patterns 120 comprise device features which narrow the process window for PV, i.e., patterns which result in a higher rate of unacceptable fabricated devices. Yield critical patterns 120 involve features which are sensitive to inaccuracy in both overlay and feature dimensions, such as CD (critical dimension) and gap width. Hence, yield critical patterns 120 may involve design element edges and distances from device element edges, features which are typically influences by both overlay and the accuracy of produced element widths. The combination of overlay and dimensional measures is generally referred to as edge placement error (EPE). The process window for PV describes the allowable PV which still yields acceptable devices, under specified criteria.

Metrology flow 100 may further comprise producing design files (e.g., GDS files) of targets 102 which may use device features 112 such as overlay critical patterns 110 or derivations thereof. For example, device-like targets 102 may comprise symmetrized and repeated overlay critical patterns 110 to represent the effects of PV on identified overlay critical patterns 110.

In certain embodiments, a parameter space of overlay critical patterns 110 may be defined, based on various parameters such as local element density, local gap density, directional densities (i.e., one dimensional densities, e.g., in x and y directions), local CD measures, local gap measures, and correlations and combinations between such measures. The parameter space may be defined with respect to features used in identifying overlay critical patterns 110, and may in some embodiments be used to characterize device regions and device designs.

One or more regions of the parameter space may be identified as being characteristics for one or more types of overlay critical patterns 110. Targets 102 may be designed with respect to these regions of the parameter space 114, e.g., targets 102 may be selected to be within these regions or to enclose these regions according to the parameters as measured on targets 102. In such embodiments, device-like targets 102 may not necessarily utilize device design elements such as overlay critical patterns 110, but may be designed to resemble patterns 110 in a more generalize manner, i.e., to represent the sensitivity of overlay critical patterns 110 to PV without directly replicating overlay critical patterns 110. In case a device-wide analysis is carried out, targets 102 may be correspondingly designed to represent the sensitivity to PV of the device as a whole. Moreover, typical target designs may be associated with typical device designs to yield an even more generalized approach to metrology device-like target design. It is noted that relaxing the requirement to replicate device patterns may be used to optimize the measurability of the designed targets. For example, the density requirement may be more relaxed in response-spanning targets 102 with respect to actual device patterns, in order to increase the optical content of target 102 and therefore increase its metrology sensitivity.

A similar approach may be applied to yield critical patterns 120 which may be identified under use of EPE measures instead of or in addition to overlay measures.

Metrology flow 100 may further comprise verification 104 of the correlation of the PV responses of the designed targets and the device with respect to the overlay and/or EPE measures. The metrology measurement process and algorithms 130 may yield results of target measurements 95 that may comprise overlay correctables 132 with respect to overlay critical patterns 110 and/or a process window center retargeting 135 as a new way of improving the production process, which is explained in the following. Certain embodiments comprise analysis of a pattern placement window (PPW) and optionally excursion monitoring 136 as explained below.

Functioning devices are constructed of many complex structures produced on different lithography steps. The structure of a specific lithography step may be printed in some distortion with respect to the design. One type of distortion is the overlay, i.e., lateral shift of the whole structure with respect to previous structures. Since overlay is probably the easiest to control and correct, fast and accurate optical metrology has been developed to measure it. In advanced semiconductor manufacturing nodes this single overlay number per layer might not be sufficient. The complex layer structure can be divided into small patterns. Each of these patterns may have a different response to the process and therefore it may exhibit a different lateral bias—this phenomenon is called Pattern Placement Error (PPE). It can be caused by, for example, scanner aberrations, etch, chemical mechanical polish, or deposition. If the diversity of the different pattern shifts is not negligible with respect to the overlay specifications, a single overlay number cannot represent the full structure; this means that different mechanisms should be used to compensate for the lateral shifts (such as aberrations tuning, etch conditions variation etc.). In the following, methods are presented for monitoring and/or controlling the diversity of the different pattern shifts in order to improve the manufacturing yield.

Figure 2:
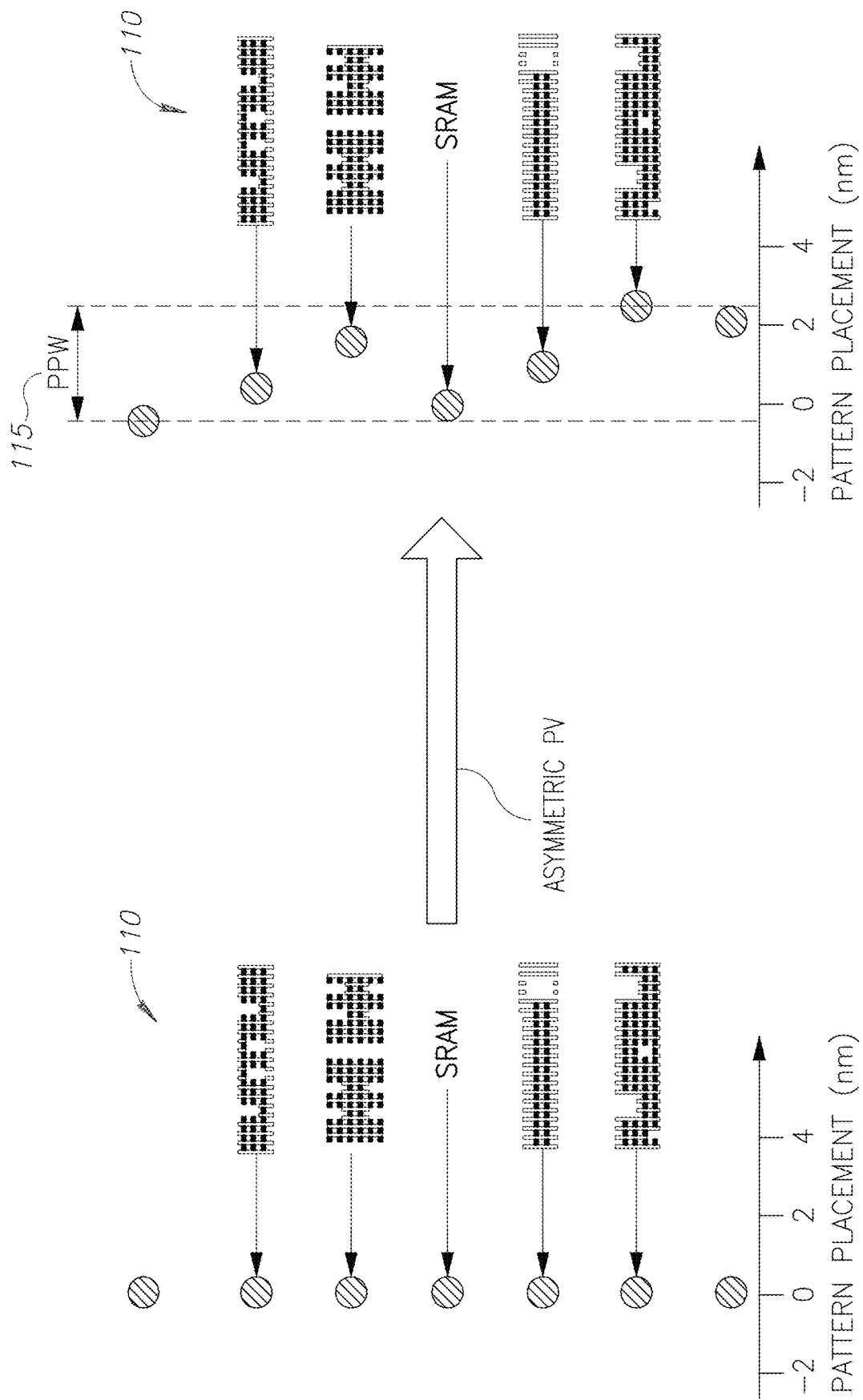
FIG. 2 is a high level schematic illustration of the concepts of overlay critical patterns and of a process window width, according to some embodiments of the invention.

FIG. 2 is a high level schematic illustration of the concepts of overlay critical patterns 110 and of a pattern placement window (PPW) 115, according to some embodiments of the invention. The inventors have found out that different overlay critical patterns 110 (illustrated schematically) having a same placement in design and under symmetric PV, may differ in their actual placement under asymmetric PV. The range of variability of the placement of different patterns 110 under certain PV is termed herein pattern placement window (PPW) 115, and the inventors acknowledge that the existence of PPW 115 cannot be resolved be applying a single overlay correction, because an overlay correction of one pattern may increase the placement error of another pattern, i.e., different patterns 110 behave differently under asymmetric PV. It is noted that asymmetric PV may comprise a host of PV aspects such as asymmetric scanner aberrations, etch tilt, CMP asymmetry etc. and typical PPW 115 due to asymmetric PV may reach several nanometers. The inventors note that the condition PPW<<OVL is necessary in order to effectively increase accuracy by an overlay correction, and further note that PPW 115 may increase with the number of layers and process steps involved in creating the pattern. For example, overlay budgets of 5 nm may allow PPW of about 0.5 nm, and several nm PPW may clearly render the application of overlay corrections alone ineffective.

Pattern Placement Window (PPW) 115 is a measure of the critical patterns shift diversity. It may be defined as the three standard deviations of the relative pattern shifts (for specific applications it can be defined differently; for example as the maximal difference between different pattern shifts). It may be measured using special overlay targets 102 and may be used to monitor the pattern bias diversity. One possible use case is that, if at some wafer locations PPW 115 exceeds some specified specifications, these locations may suffer from yield issues. Moreover, based on the PPW signature or using smart target design the problematic process step can be identified. This allows excursion monitoring in much early process step in addition to inline root cause analysis.

Prolith simulations carried out by the inventors have shown that different device patterns such as lines and holes in a designed layer are influenced differently by scanner aberrations. For example, in one design, pattern placement error (PPE) of holes was smaller than PPE for lines, for CDs under 40 nm, while holes PPE was similar to lines PPE between 40-80 nm.

The design of PPW targets 102 may be optimized using simulations and/or measurements of device pattern behavior versus metrology feature reported overlay (under varying process conditions). In this approach, PPW target patterns may be different from the device patterns. For example, if some process step is strongly dependent on the density at some length scale, different features of the target would have different density at this length scale. Such processes can be CMP with length scale of 1-10 μm or etch with length scale of 50 nm-1 μm (the actual numbers are process dependent and could be different). Another example is the dependency on the pitch that can modify the response to scanner aberrations. Additional parameters that may be modified are, for example, shape, duty-cycle and previous layer pattern.

As exemplified below, two different approaches may be taken: (i) PPW targets 102 may be used for monitoring any aberrations, and thus may have features which are designed to react to any aberration relating to a specific device feature, and (ii) PPW targets 102 may be designed to be sensitive to specific aberrations and to allow inline PPW root cause analysis. Furthermore, in both approaches, process, lithography and metrology simulations may be used to match relative placements of different device and target features. The device and target PPW may be either equal or bigger by a known factor (i.e., in the presence of the same process variations PPWtarget=A·PPWdevice, where A is a known constant). The inventors have further found out that PPW 115 may be used to characterize specific asymmetric PV and relate it to specific process, by applying field-wide and/or wafer wide analysis.

Figure 3A:
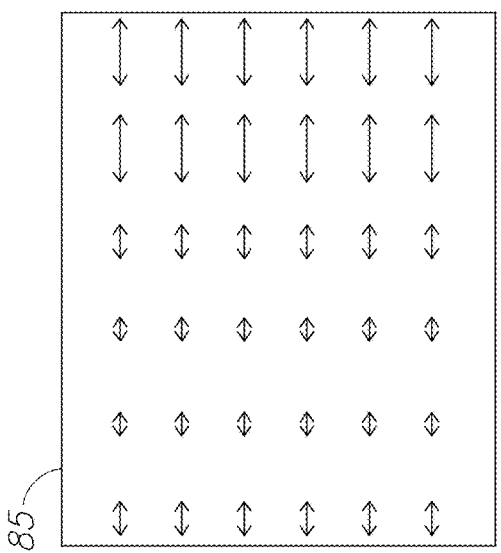
FIGS. 3A and 3B schematically illustrate field-wide PPW measurements along an x direction, according to some embodiments of the invention.
Figure 3B:
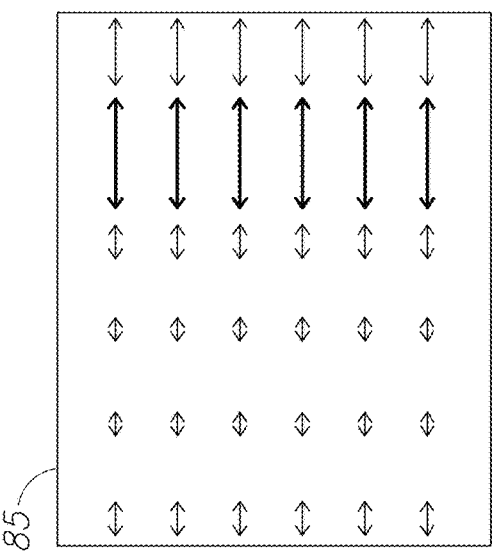

FIGS. 3A and 3B schematically illustrate field-wide PPW measurements along an x direction, according to some embodiments of the invention. FIG. 3A schematically illustrates the first approach of monitoring all aberrations, with PPW measurements indicated as arrows, and FIG. 3B schematically illustrates field locations in which the device will suffer from some yield lost, as identified by (big and) out-of-spec PPW values (bold). Furthermore, the field signature of the PPW is typical for scanner aberrations. This information can be used to alert the fab that the scanner aberrations are out of control.

Figure 4A:
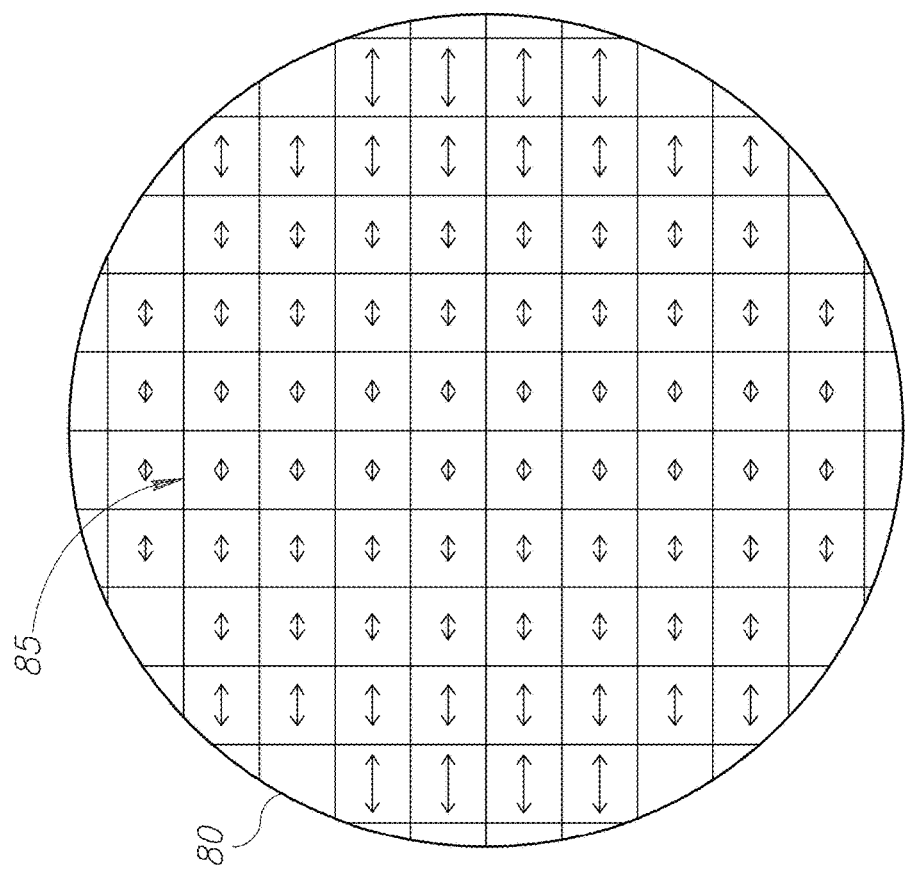
FIGS. 4A, 4B and 4C schematically illustrate wafer-wide×PPW measurements, according to some embodiments of the invention.
Figure 4C:
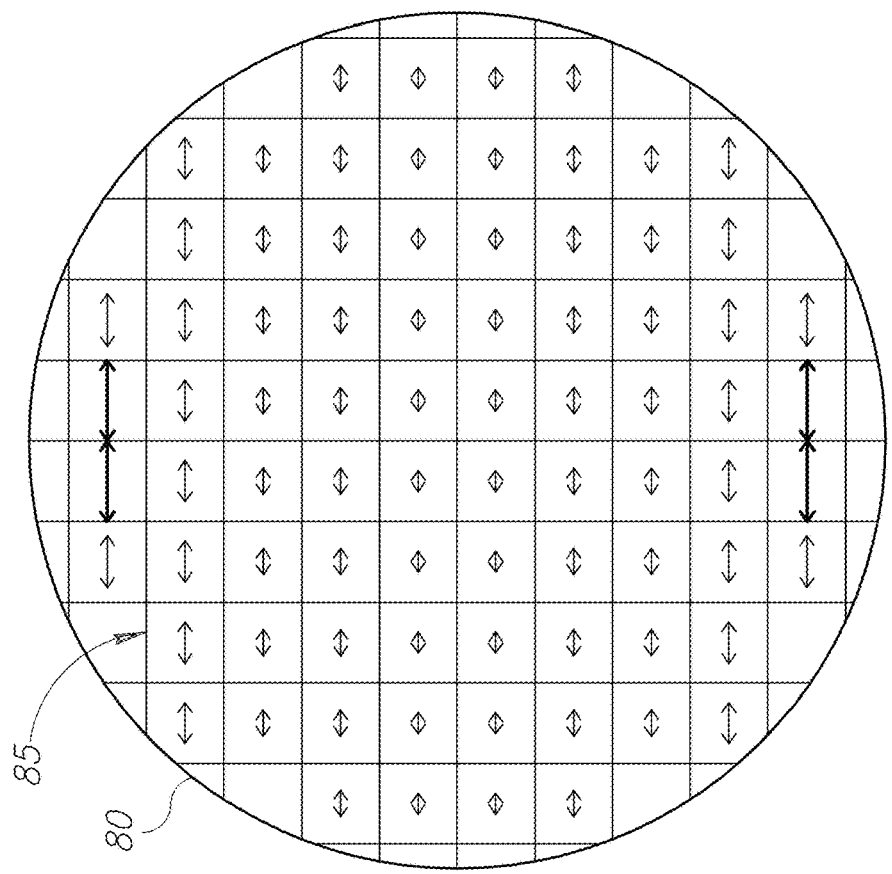
Figure 4B:
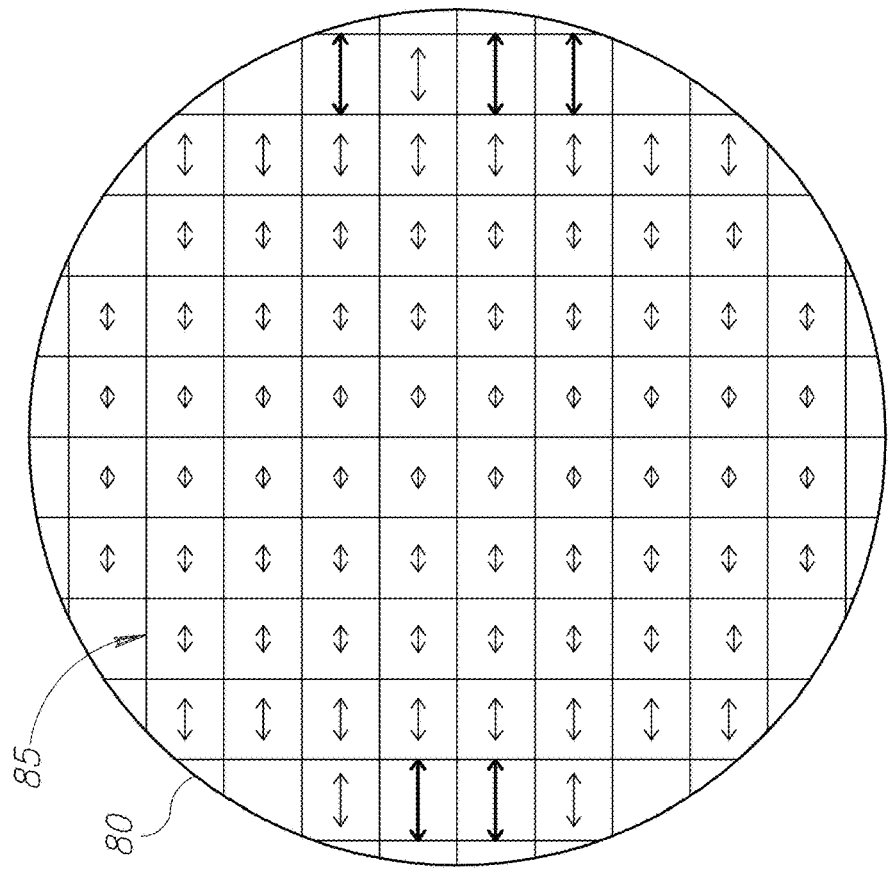

FIGS. 4A, 4B and 4C schematically illustrate wafer-wide×PPW measurements, according to some embodiments of the invention. At the level of whole wafer 80, the variability of PPW over fields 85 in wafer 80 (indicated by single arrows indicating PPW per field) may be used to detect various wafer scale PV, such as etch signatures (FIG. 4A, indicated by laterally increasing PPW), etch excursions (FIG. 4B, largest arrows, bold), CMP signatures and excursions (FIG. 4C, largest arrows, bold) and so forth. Directional analysis of PPW gradients across the wafer (e.g., x vs. y directions) may be correlated with specific sources of inaccuracy. The relation between PPW gradients at the field level and PPW gradients at the wafer level may also indicate specific causes of inaccuracy. Such relations may be studied in detail by applying a full root cause analysis of PPW.

It is noted that PPW patterns over the fields and the wafer are a measure for quantifying the effects and impact of asymmetric PV on the produced devices and present a new way of quantifying these effects.

FIGS. 5A, 5B and 6A-C are high level schematic illustrations of PPW targets 102, according to some embodiments of the invention.

FIG. 5A schematically illustrates a top view of an imaging target 102 which is composed of several critical patterns, which may comprise overlay critical patterns 110 and/or yield critical patterns 120. Any one or more combinations of critical patterns may be used to construct any number of targets.

FIG. 5B schematically illustrates certain embodiments which comprise targets 102 having periodic structures with segmented elements, which exhibit varying segmentation pitches. For example, different periodic structures 103 having elements 103A (and possibly additional structures) of imaging target 102 such as AIM ("Advanced Imaging Metrology") may differ in segmentation pitches ($p_1$, $p_2$, etc.) and/or in element CDs ($CD_1$, $CD_2$ etc.) to simulate different critical patterns and/or to characterize PPW 115 under PV. Gaps G between segmented elements and element width D may be maintained the same of the periodic structures. Certain embodiments comprise e.g., four sets of periodic structures having different pitches $p_i$ and/or different $CD_i$ (e.g., pitches of 80 nm, 100 nm, 150 nm and 200 nm). Etch simulations (e.g., of Reactive-Ion Etching, including microloading and shadowing (aspect-ratio) effects) demonstrate that possible relevant length scale for PPW due to etch effect can be in the order of 50-200 nanometers (for some device layout and etch process). PPW targets 102 designed according to the principles illustrated in FIG. 5B may be imaging overlay targets in which all features are at the same layer, the segmentation pitch ($P_i$) is varied between the different gratings while the coarse space (G) and the segmentation duty-cycle (D) are kept constant. Measurement of the relative offsets between the different features may represent the device PPW. It is noted that PPW targets 102 as illustrated in FIG. 5B may contain more than two patterns.

Certain embodiments comprise imaging targets 102 comprising a plurality of structures 103 having a same plurality of specified geometrical parameter values. In certain embodiments, structures 103 may be periodic structures 103 having same geometrical parameter values such as same coarse space (G) and a same duty cycle (D). Periodic structures 103 comprise segmented elements 103A with a segmentation pitch that differs among periodic structures 103.

FIGS. 6A-6C schematically illustrate SCOL (scatterometry overlay) targets 102, according to some embodiments of the invention.

FIG. 6A schematically illustrates a side view of SCOL target 102 which comprises a first target layer 102A composed of several critical patterns, which may comprise overlay critical patterns 110 and/or yield critical patterns 120, and a second target layer 102B comprising structures which are identical or similar and shared with respect to all the critical patterns of target 102. It is noted that targets 102 may be used in actual measurements and/or in simulation to estimate PPW 115. In certain embodiments, targets 102 may be measured and/or simulated under different sets of process parameters and be thus used to characterize PV under ranges of process parameters.

FIG. 6B schematically illustrates a top view of one layer of SCOL target 102 having periodic structures with a common pitch ($p_1=p_2=p_3$) and differing CDs ($CD_1$, $CD_2$, $CD_3$ etc.). Certain embodiments comprise e.g., four sets of periodic structures having different $CD_i$ (e.g., CDs of 50 nm, 75 nm, 100 nm and 125 nm). Several cells may be designed with different current layer CD while keeping the previous layer grating identical for all cells. Top and bottom cells have offsets of $+f_0$ and $-f_0$, respectively. Certain embodiments comprise SCOL target 102 comprising a plurality of cell pairs 103, cells 103A sharing a periodic structure at a previous layer of target 102 (not shown, similar to layer 102B in FIG. 6A). Cells 103A in each pair 103 have opposite designed offsets ($+f_0$ and $-f0$) with respect to the shared periodic structure. Periodic structures 103, at the top layer (equivalent to layer 102A in FIG. 6A) of each cell pair 103A have a same pitch ($p_1=p_2=p_3$) and a different CD ($CD_1 \neq CD_2 \neq CD_3$) with respect to other cell pairs 103A.

FIG. 6C schematically illustrates a top view of SCOL target 102 having a single layer (side by side SCOL) with segmented element having differing pitches ($p_1$, $p_2$, $p_3$ etc.) and different CDs ($CD_1$, $CD_2$, $CD_3$ etc.), in a repetitive pattern, having a common pitch P for the different elements. Such targets 102 may be measured using the induced offsets and algorithms described in U.S. Patent Application No. 62/110,431, which is incorporated by reference in its entirety. Certain embodiments comprise single layer SCOL target 102 comprising a periodic structure having a repeated structure 103 (repeated at periodicity, or pitch P) which comprises a plurality of periodic elements 103A differing from each other in pitch ($p_1 \neq p_2 \neq p_3$) and CD ($CD_1 \neq CD_2 \neq CD_3$).

In certain embodiments, metrology targets 102 comprise a plurality of overlay critical patterns which are identified in a device design as having an overlay sensitivity to process variation above a specified threshold. Metrology targets 102 may be designed by symmetrization and repetition of the overlay critical patterns. Metrology targets 102 may be designed as imaging targets comprising multiple cells, each cell designed according to a different one of the overlay critical patterns or as SCOL targets, comprising multiple cells, each cell designed according to a different one of the overlay critical patterns, and at least one shared layer with at least one periodic structure having same parameters in all cells. In certain embodiments, targets 102 may be designed to be within or to enclose a calculated parameters space of the overlay critical pattern. It is noted that the different patterns may differ in CD and/or pitch, or may have the same CD and/or pitch and differ in other geometrical properties.

Advantageously, PPW monitoring provides inline monitoring of device pattern placement diversity using optical overlay metrology and targets and excursion detection based on inline PPW monitoring. Furthermore, PPW analysis may provide control of process steps (e.g., etch, CMP, deposition, scanner aberrations etc.) based on target designs which represent relative placements of different device patterns in the same layer. The PPW approach also enables using process, lithography and metrology simulations to match relative placements of different device and target features (instead of optimizing single target to single device and process), including those in which the target PPW is bigger by a known factor with respect to the device PPW. Finally, the PPW approach enables inline PPW root cause analysis based on any combination of: PPW field signature, PPW wafer signature, PPW excursion step (e.g., after litho, after etch, after CMP etc.), and special targets with either density variations at different length scale or other geometric variations which are process specific.

Figure 7:
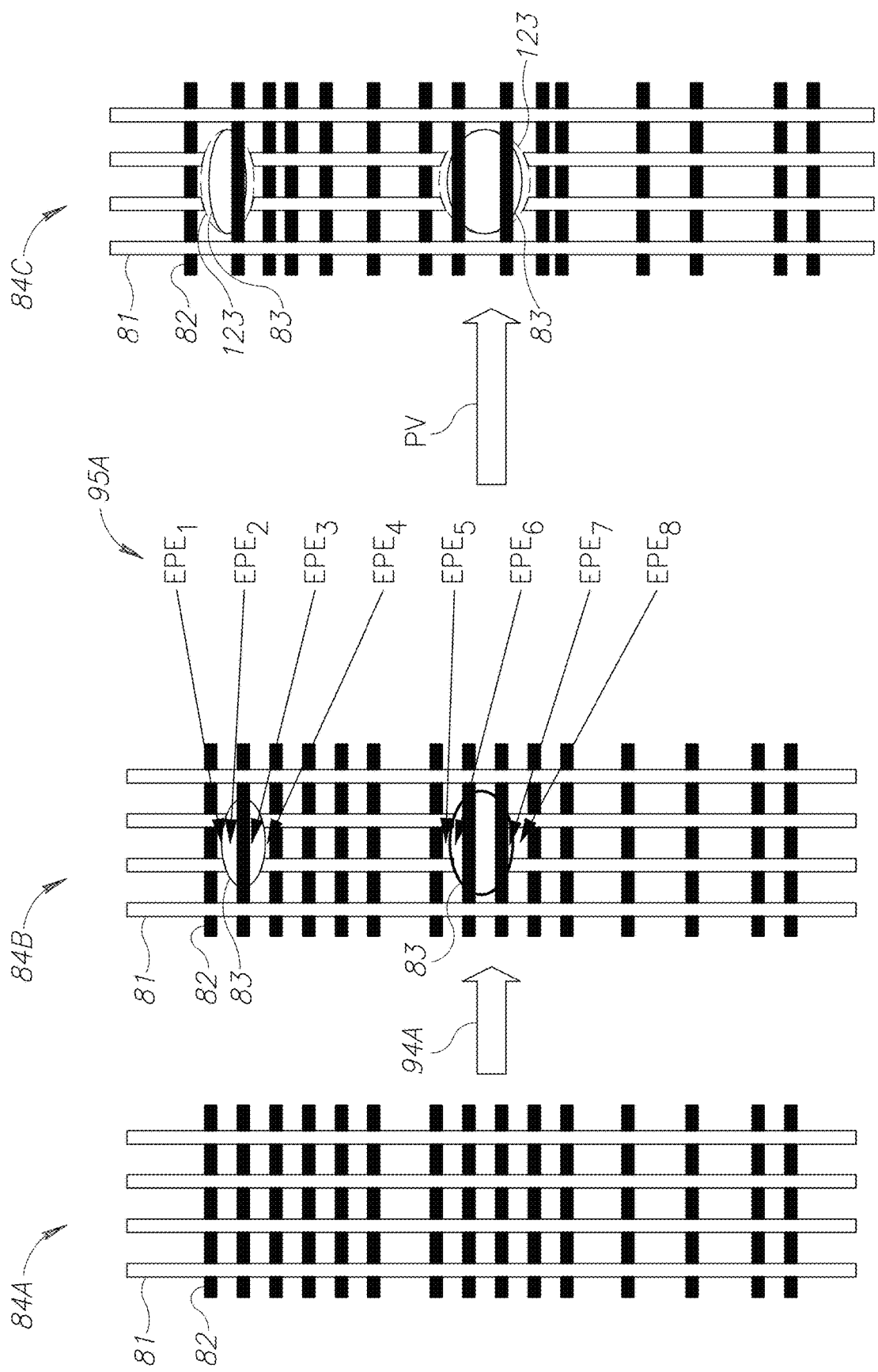
FIG. 7 is a high level schematic illustration of the concept and calculation of edge placement error (EPE) which combines overlay and dimensional measures, according to some embodiments of the invention.

FIG. 7 is a high level schematic illustration of the concept and calculation of edge placement error (EPE) which combines overlay and dimensional measures, according to some embodiments of the invention. FIG. 7 illustrates schematically production steps 84A, 84B, e.g., of FinFET (field-effect transistor) devices, comprising active layer 82 and gate layer 81 which may be produced by double, quadruple or generally multiple patterning. After producing layers 81, 82 at step 84A, a cut mask 83 is applied (94A) to remove portions of gate layer 81 (in the illustrated case) and thus yield functioning devices. Cut mask 83 is represented in FIG. 7 by ellipses designating the locations and dimensions of the cuts. Upon applying this process, multiple accuracy measures are employed in order to characterize the spatial relations between elements in same and different layers, which are generally termed the edge placement error, EPE, at different locations. Exemplified are eight EPE's 95A that represent these spatial relations. Explicitly, EPE's 95A may be defined as in Equations 1, with OVL denoting the (shared) overlay of layer 81 with respect to layer 82, $\Delta CD_1$, $\Delta CD_2$, $\Delta CD_3$ the error in the CD of elements 82 according to their positional order, $\Delta CD_{s2}$ the error in the CD of spaces between elements 82, and $\Delta CD_{c1}$ and $\Delta CD_{c2}$ the error in the CD of cuts 83 ($\Delta$ cut CD).

$$EPE_1 = \frac{\Delta CD_2}{2} - \frac{\Delta CD_{c1}}{2} - OVL$$

$$EPE_2 = \frac{\Delta CD_2}{2} + \frac{\Delta CD_{c1}}{2} + OVL$$

$$EPE_3 = -\frac{\Delta CD_2}{2} - \Delta CD_{s2} + \frac{\Delta CD_{c1}}{2} - OVL$$

$$EPE_4 = \frac{\Delta CD_2}{2} + \Delta CD_{s2} + \Delta CD_3 - \frac{\Delta CD_{c1}}{2} + OVL$$

$$EPE_5 = \frac{\Delta CD_2}{2} + \Delta CD_{s2} + \Delta CD_1 - \frac{\Delta CD_{c2}}{2} - OVL$$

$$EPE_6 = -\frac{\Delta CD_2}{2} - \Delta CD_{s2} + \frac{\Delta CD_{c2}}{2} + OVL$$

$$EPE_7 = -\frac{\Delta CD_2}{2} - \Delta CD_{s2} + \frac{\Delta CD_{c2}}{2} - OVL$$

$$EPE_8 = \frac{\Delta CD_2}{2} + \Delta CD_{s2} + \Delta CD_3 - \frac{\Delta CD_{c2}}{2} + OVL$$

Equations 1

The related quality criterion may be a lower bound to all $EPE_i$ ($EPE_i > EPE_{threshold}$ for all i) to ensure proper spacing between all element edge pairs.

As the OVL and various CD's have different sensitivities to PV, one or some of the $EPE_i$'s may tend to be smaller than others due to PV, and metrological feedback may comprise corrections that equalize the $EPE_i$'s over the design. For example, in certain embodiments, cuts 83 may be modified or retargeted to cuts 123 (e.g., repositioned or enlarged) to provide a wider process window, as explained below. Specifically, mandrel CD errors (mandrels are the elements that support the production of the fins and determine the spaces between fins) may be compensated by cut CD retargeting.

Figure 8A:
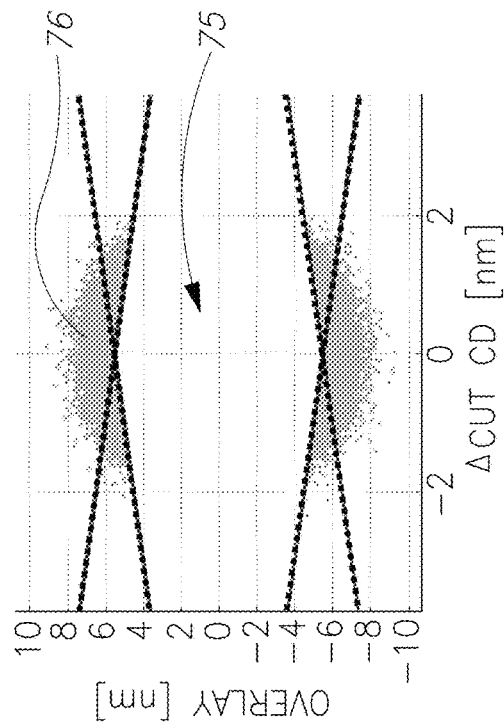
FIGS. 8A-8D are high level schematic illustrations of the effects of EPE limitations on the process window, according to some embodiments of the invention.
Figure 8B:
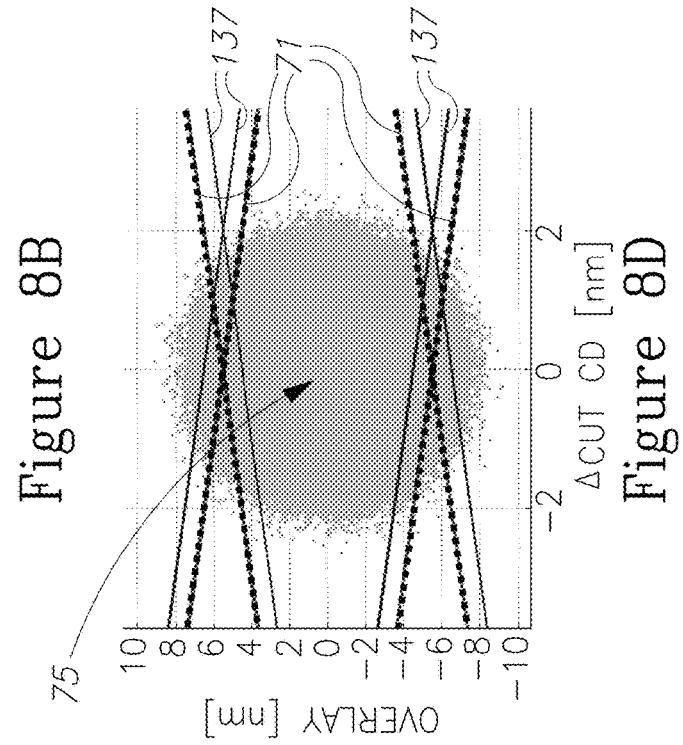
Figure 8C:
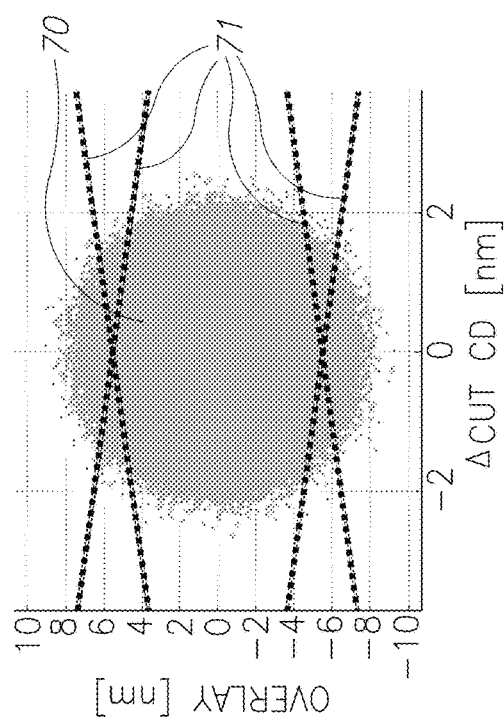
Figure 8D:
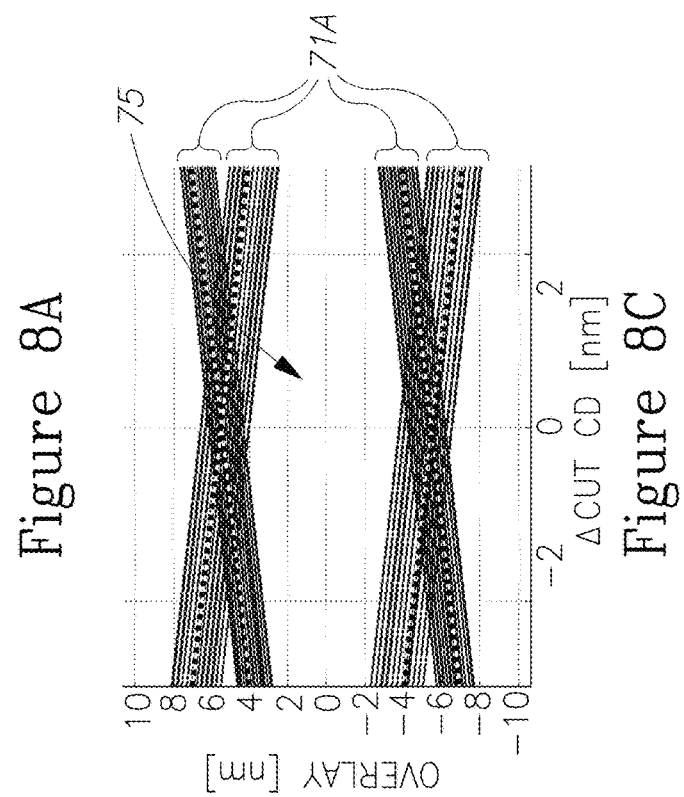

FIGS. 8A-8D are high level schematic illustrations of the effects of EPE limitations on the process window, according to some embodiments of the invention. FIG. 8A schematically illustrates EPE limitations 71 (Equations 1) over a distribution 70 of OVL and $\Delta$ cut CD values. Only the four most limiting EPE limitations 71 are presented in this example. FIG. 8B schematically illustrates a process window 75, defined as allowed OVL and $\Delta$ cut CD values, while OVL and $\Delta$ cut CD values which cause any one of the EPE's to be too small are excluded 76 from process window 75. FIG. 8C schematically illustrates the effect of PV (process variations) on EPE limitations 71, namely the generation of multiple EPE limitations 71A that further narrow process window 75. FIG. 8D schematically illustrates the effect of a 2 nm mandrel CD error on EPE limitations 71 and process window 75. The error shifts some EPE limitations 137 to cut deeper into distribution 70 of OVL and A cut CD values and reduce process window 75 (in the illustrated case causing ca. 1% yield loss). While overlay control may be tightened to respond to the PV error (in the illustrated case an almost 1 nm tighter OVL control is required), retargeting the cut CD may reduce the reduction in the size of the process window while maintaining the overlay budget.

Figure 9B:
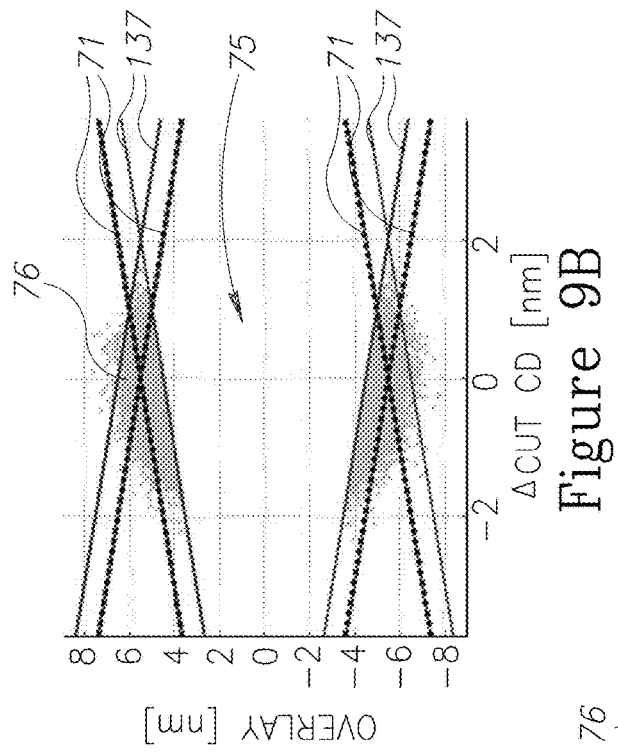
FIGS. 9A-9C are high level schematic illustrations of cut CD retargeting as means to reduce yield loss by narrowing of the process window due to mandrel CD errors, according to some embodiments of the invention.
Figure 9A:
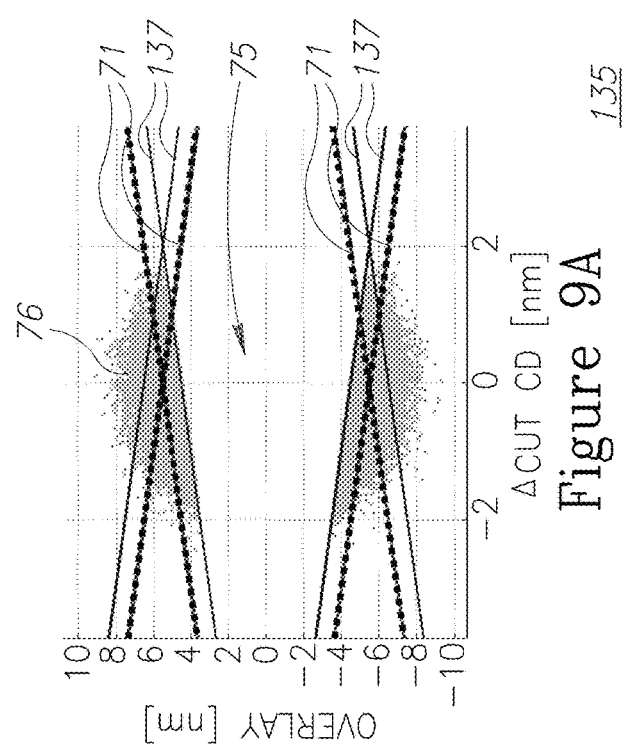
Figure 9C:
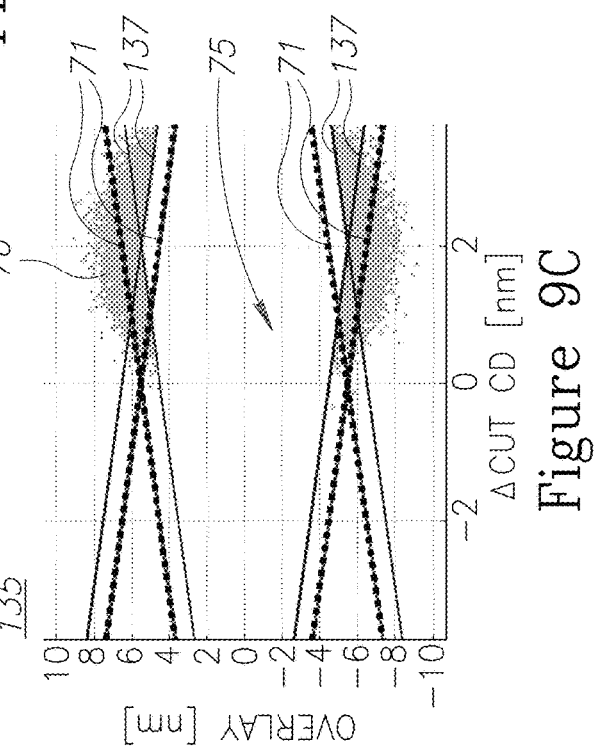

FIGS. 9A-9C are high level schematic illustrations of cut CD retargeting as means to reduce yield loss by narrowing of the process window due to mandrel CD errors, according to some embodiments of the invention. FIG. 9A illustrates an example for process window 75 and excluded values 76 for a 2 nm mandrel CD error, causing a yield decrease of ca. 1%. FIG. 9B illustrates tighter overlay control (note the narrower overall value distribution, schematically from −10 nm<OVL<10 nm in FIG. 9A to −8 nm<OVL<8 nm in FIG. 9B), that reduces the yield loss to below 0.5%. FIG. 9C illustrates embodiments of cut CD retargeting, in the illustrated case by 2 nm (note the shift of the distribution), which likewise reduces the yield loss to below 0.5% without the need of tighter overlay control. Hence, modifying production processes based on EPE measurements provides an effective accommodation to PV effects at smaller device dimensions. It is noted that the effect of other PV factors may be cancelled out or relieved by corrected other production parameters in a similar way.

Figure 10:
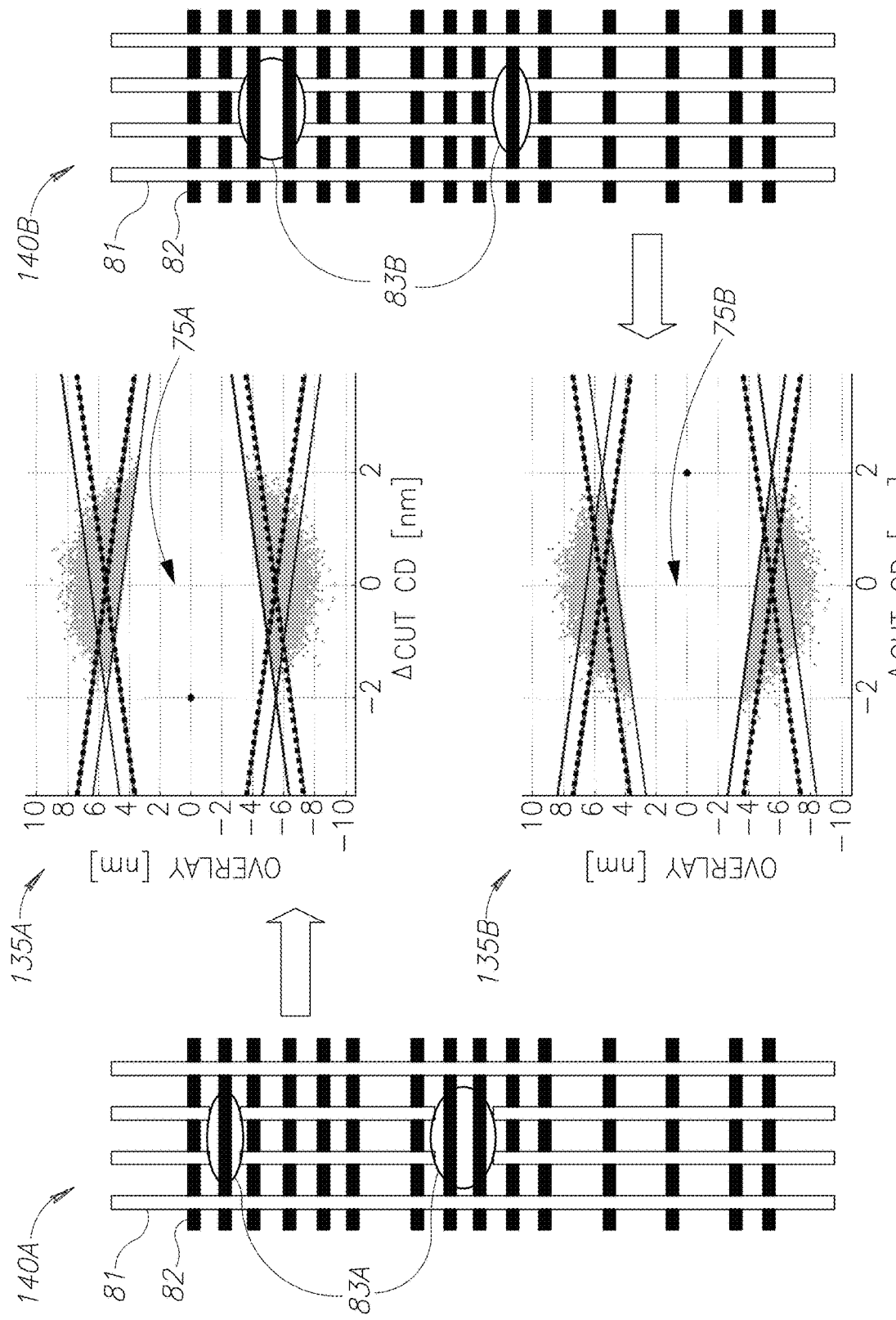
FIG. 10 is a high level schematic illustration of multiple cut CD retargeting, according to some embodiments of the invention.

FIG. 10 is a high level schematic illustration of multiple cut CD retargeting, according to some embodiments of the invention. In certain embodiments, different parts of the cut mask that have similar effects on the EPEs may be retargeted by different values. In general, PV factors with different effects on the EPEs may be compensated by different retargeting corrections of the process window to further enhance the yield. In the illustrated example, cuts 83A in mask part (or mask) 140A are retargeted by −2 nm (indicated as a dot in the top process window retargeting diagram 135A) to yield respective process window 75A; while cuts 83B in mask part (or mask) 140B are retargeted by +2 nm (indicated as a dot in the bottom process window retargeting diagram 135B) to yield respective process window 75B. It is noted that in terms of PPW 115, factors that cause expansion of PPW 115 in one direction may be corrected together, and separately from factors that cause expansion of PPW 115 in the opposite direction. Design analysis 101 may comprise analogous corrections in various cases.

Figure 11:
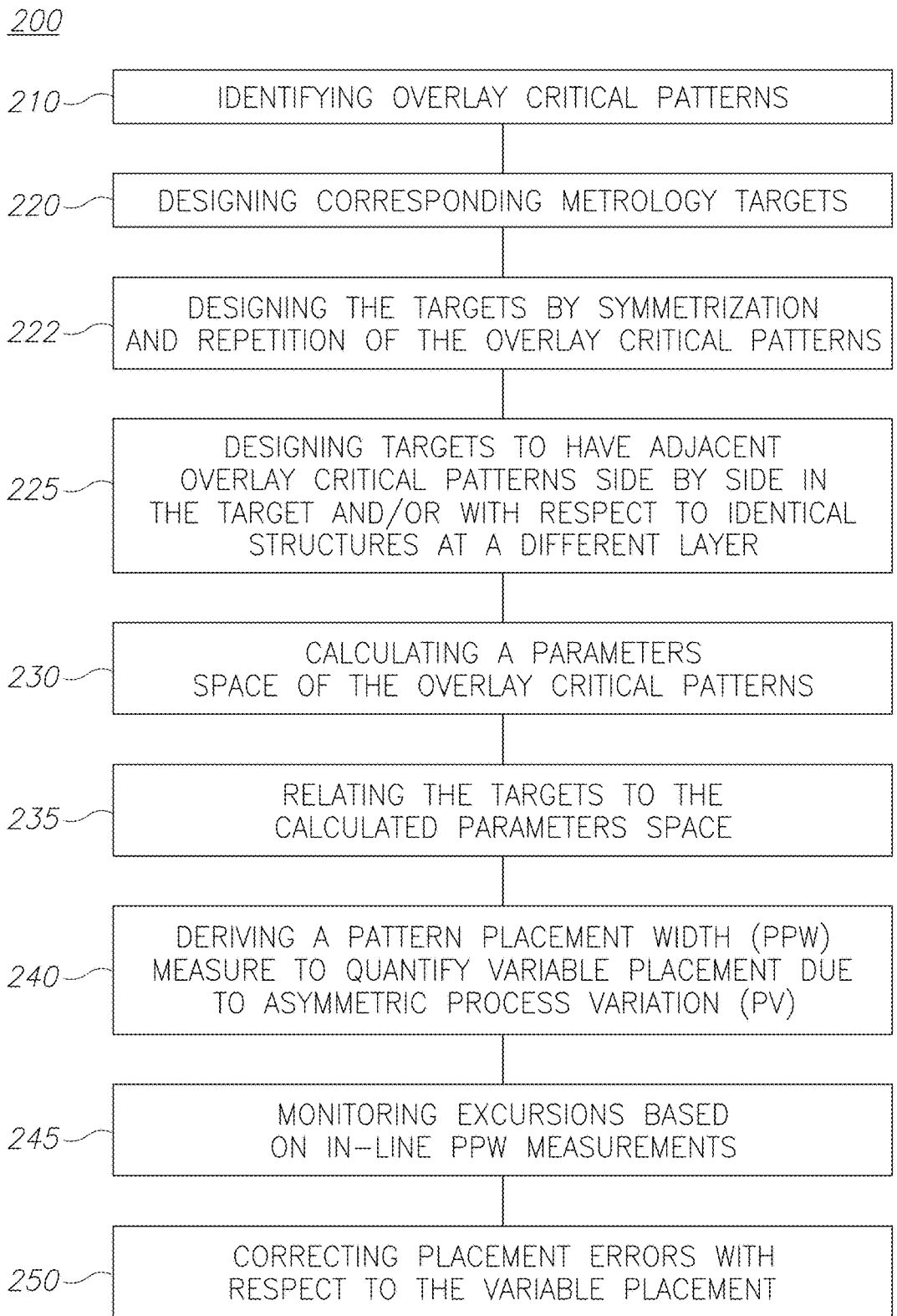
FIG. 11 is a high level flowchart illustrating a method, according to some embodiments of the invention.

FIG. 11 is a high level flowchart illustrating a method 200, according to some embodiments of the invention. Method 200 may be at least partially implemented by at least one computer processor, e.g., in a metrology module. Certain embodiments comprise computer program products comprising a computer readable storage medium having computer readable program embodied therewith and configured to carry out of the relevant stages of method 200. Certain embodiments comprise target design files of respective targets designed by embodiments of method 200.

Method 200 may comprise identifying overlay critical patterns in a device design (stage 210) and using and designing metrology targets that correspond to the overlay critical patterns (stage 220). For example, the overlay critical patterns may be ones that have an overlay sensitivity to process variation above a specified threshold.

In certain embodiments, the targets may be designed by summarization and repetition of the critical patterns (stage 222). In certain embodiments, the metrology targets may be designed to comprise multiple cells (positioned e.g., side by side), each designed according to a different one of the overlay critical patterns; and/or designed to comprise multiple cells that have in at least one shared layer at least one periodic structure having same parameters in all cells (stage 225).

Method 200 may further comprise calculating a parameters space of the critical pattern (stage 230) and relating the targets to the calculated parameters space (stage 235), e.g., by designing the targets to be within the calculated parameters space and/or by designing the targets to enclose the calculated parameters space.

In certain embodiments, method 200 may comprise deriving a pattern placement width (PPW) measure to quantify variable placement of the overlay critical patterns due to asymmetric process variation (PV) (stage 240) and monitoring excursions based on in-line PPW measurements (stage 245). Method 200 may further comprise correcting placement errors with respect to the variable placement according to the derived PPW measure (stage 250). Method 200 may further comprise using the PPW measure to characterize the PV at the field and/or wafer levels (stag 260).

In certain embodiments, method 200 may comprise identifying yield critical patterns (stage 270) according to a corresponding process window narrowing due to specified process variation, wherein the narrowing is defined by a dependency of edge placement errors (EPEs) of the patterns on process parameters. Method 200 may further comprise estimating the narrowing of the process window due to the effects of PV on the yield critical patterns (stage 275) and/or modifying at least one process parameter to reduce the narrowing of the process window (stage 280).

In certain embodiments, method 200 may comprise associating the identified yield critical patterns according to their effects on the process window (stage 290) and correcting for the process window narrowing, commonly for the associated patterns (stage 295), e.g., by splitting a cut mask to associate production of the associated critical patterns (stage 297).

Method 200 may comprise designing imaging targets to have multiple periodic structures having same coarse spaces and duty cycles, and different element segmentation pitches (stage 300).

Method 200 may comprise designing SCOL targets having multiple cell pairs sharing a previous layer periodic structure and having a same pitch and a different CD at the current (upper) layer (stage 310); the cells in each pair having opposite designed offsets with respect to the shared periodic structure at the previous (bottom) layer.

Method 200 may comprise designing single layer SCOL targets as a periodically repeated structure having elements that differ from each other in pitch and CD (stage 320).

Method 200 may further comprise producing any of the designed targets (stage 330) and/or measuring any of the targets and deriving metrology measures form the measurements (stage 340).

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implementable method of designing a circuit device, the method executable on a computer including a central processing unit (CPU) capable of executing computer readable instructions stored on a non-transitory computer readable storage medium, which instructions, when read by the CPU, cause the CPU to perform operations comprising:

on a metrology target of a simulated circuit device, identifying at least one simulated circuit device pattern having an increased potential of producing a higher incidence of unacceptable devices as compared to one or more simulated circuit patterns identified as producing acceptable devices based on at least one specified process variation, which at least one specified process variation narrows a range of acceptable production deviations, wherein the narrowing of the range of acceptable production deviations is based on an edge placement error of the simulated circuit device pattern and at least one process parameter.

2. The computer implementable method of claim 1, wherein the CPU performs operations further comprising estimating the range of acceptable production deviations due to an effect of the at least one specified process variation/inaccuracy (PV) on the at least one simulated circuit device pattern that has the increased potential of producing the higher incidence of unacceptable devices.

3. The computer implementable method of claim 1, wherein the CPU performs operations further comprising modifying the at least one process parameter to modify the range of acceptable production deviations.

4. The computer implementable method of claim 1, wherein the CPU performs operations further comprising associating the identified at least one simulated circuit device pattern that has the increased potential of producing the higher incidence of unacceptable devices according to its effect on the range of acceptable production deviations.

5. The computer implementable method of claim 4, wherein the CPU performs operations further comprising correcting for the range of acceptable production deviations, commonly for an associated at least one simulated circuit device pattern that has the increased potential of producing the higher incidence of unacceptable devices.

6. The computer implementable method of claim 5, wherein the CPU performs operations further comprising splitting a cut mask to associate production of the associated at least one simulated circuit device pattern that has the increased potential of producing the higher incidence of unacceptable devices.

* * * * *